United States Patent [19]
Matsumoto et al.

[11] Patent Number: 5,748,377
[45] Date of Patent: May 5, 1998

[54] HEADUP DISPLAY

[75] Inventors: Tsuyoshi Matsumoto; Yoshihiro Mizuno; Keiichi Omata; Shin Eguchi, all of Kawasaki, Japan

[73] Assignee: Fujitsu Limited, Kanagawa, Japan

[21] Appl. No.: 666,907

[22] Filed: Jun. 20, 1996

[30] Foreign Application Priority Data

Oct. 26, 1995 [JP] Japan .................. 7-278519

[51] Int. Cl.⁶ .................................. G02B 27/14
[52] U.S. Cl. .................. 359/633; 359/728; 359/730; 359/858
[58] Field of Search .................. 359/14, 13, 729, 359/730, 731, 857, 858, 859, 633

[56] References Cited

U.S. PATENT DOCUMENTS 5,363,220  11/1994  Kuwayama et al. .......... 359/13
5,506,595  4/1996   Fukano et al. .............. 359/13
5,594,588  1/1997   Togino ..................... 359/631

*Primary Examiner*—David C. Nelms
*Assistant Examiner*—Thomas Robbins
*Attorney, Agent, or Firm*—Nikaido Marmelstein Murray & Oram LLP

[57] ABSTRACT

A headup display including a light emission-type display source, a concave mirror having an spherical reflecting surface and located so as to reflect light emitted from the display source, and a reflection-type hologram located so as to reflect the light reflected on the concave mirror toward an observer in a mobile unit. The concave mirror is configured so that its lateral focal length contributing to lateral enlargement of a displayed image is shorter than its longitudinal focal length contributing to longitudinal enlargement of the displayed image. The reflection-type hologram is configured so that its longitudinal focal length contributing to longitudinal enlargement of the displayed image is shorter than its lateral focal length contributing to lateral enlargement of the displayed image.

11 Claims, 7 Drawing Sheets

HEADUP DISPLAY

BACKGROUND OF THE INVENTION

1. Field of the Invention

The present invention relates to a headup display for use in a vehicle or the like.

2. Description of the Related Art

A headup display is a kind of display having an information display source and transparent reflecting means called a combiner to superimpose displayed information reflected from the combiner on a front view seen by a driver in an automobile, for example. The use of such a headup display allows the driver in the automobile to see the information from the display source without almost turning his/her eyes from the front view, thereby contributing to safety driving.

In a headup display for an automobile, an information display position by the headup display is generally set in front of the driver or slightly shifted from the front position in the lateral direction. Accordingly, the combiner and the display source for displaying information are generally located near a dashboard in front of the driver. However, since various instruments such as a speedometer and a tachometer are incorporated in the dashboard, there is almost no spatial room for locating the display source and other components of the headup display inside the dashboard.

To make it possible to mount the headup display in various kinds of vehicles, it is effective that the headup display is to be configured independently of the instruments incorporated in the dashboard and to be mounted on the dashboard, rather than incorporating the headup display in the dashboard. The headup display is generally composed of an optical unit and a combiner. The optical unit includes a display source and a mirror for bending an optical path. While a semitransparent mirror is generally used as the combiner, the use of a reflection-type hologram having optical power or image forming characteristics and capable of transmitting light other than specific wavelength band to be reflected has also been proposed.

In the conventional headup display using a semitransparent plane mirror as the combiner, the optical unit becomes large in size, so that there is a problem that the optical unit of the headup display mounted on the dashboard may partially obstruct the front view of the driver. Accordingly, it is desirable to minimize the thickness of the optical unit of the headup display. The optical unit of the headup display may be thinned by using an element having optical power, such as a concave mirror, as the combiner. In this type, since an original image is enlarged by the combiner, a small-sized display source can be used, and the height of an optical path from the display source to the combiner can also be reduced.

The shorter the focal length of the combiner, the higher the magnification of enlargement of a displayed image, thus more thinning the optical unit of the headup display. On the other hand, a reflection-type hologram is known as reflecting means having optical power and capable of transmitting light other than specific wavelength band to be reflected. However, the reflection-type hologram with optical power has a large chromatic aberration at its peripheral portion. As shown in FIG. 1, the chromatic aberration is small at the central portion of the hologram; however, it becomes larger toward the peripheral portion because spatial frequency becomes larger from the central portion toward the peripheral portion. To reduce the chromatic aberration, the magnification power must be reduced, and it is accordingly necessary to ensure a large space for accommodating a large-sized display source and optical unit. Thus, there is a limit in size reduction of the optical unit in the case where the reflection-type hologram is used as the combiner of the headup display.

SUMMARY OF THE INVENTION

It is therefore an object of the present invention to provide a headup display which can suppress the chromatic aberration of a reflection-type hologram and can be reduced in thickness.

In accordance with an aspect of the present invention, there is provided a headup display comprising a light emission-type display source; a first concave mirror located so as to reflect light emitted from the display source, the first concave mirror having an aspherical reflecting surface, the first concave mirror having a lateral focal length contributing to lateral enlargement of a displayed image and a longitudinal focal length contributing to longitudinal enlargement of the displayed image, the lateral focal length being shorter than the longitudinal focal length; and a reflection-type hologram located so as to reflect the light reflected on the first concave mirror toward an observer in a mobile unit, the reflection-type hologram having a longitudinal focal length contributing to longitudinal enlargement of the displayed image and a lateral focal length contributing to lateral enlargement of the displayed image, the longitudinal focal length of the hologram being shorter than the lateral focal length of the hologram.

Preferably, the reflection-type hologram has a laterally elongated, rectangular shape, and spatial frequency at laterally opposite ends of the hologram is substantially equal to that at longitudinally opposite ends of the hologram. Preferably, the aspherical reflecting surface of the first concave mirror is a cylindrical surface or a toroidal surface.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

The principle of the present invention will now be described. The focal length of a reflection-type hologram is determined by a distribution of spatial frequency of interference fringes recorded on the hologram. The spatial frequency means the number of interference fringes per unit length. In a reflection-type hologram having reflection characteristics equivalent to those of a usual concave mirror, the interference fringes are concentrically formed as shown by a hologram 2 in FIG. 2A, and the distribution of spatial frequency has rotational symmetry.

Figure 1:
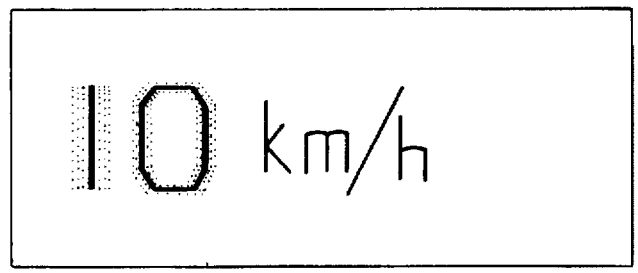
FIG. 1 is a view showing the chromatic aberration of a reflection-type hologram in the related art.
Figure 2A:
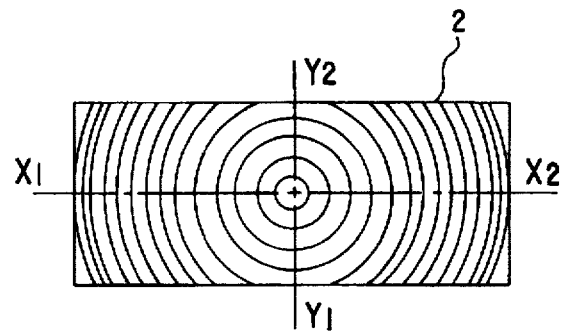
FIG. 2A is a view showing the concentric interference fringes of a reflection-type hologram in the related art.
Figure 2B:
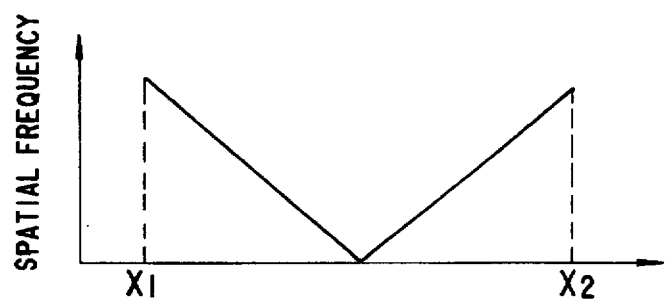
FIG. 2B is a view showing a distribution of spatial frequency in the lateral direction of the hologram shown in FIG. 2A.
Figure 2C:
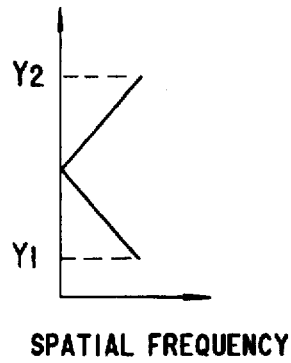
FIG. 2C is a view showing a distribution of spatial frequency in the longitudinal direction of the hologram shown in FIG. 2A.

In respect of the hologram 2 shown in FIG. 2A, FIG. 2B shows a distribution of spatial frequency in an X-axis direction (lateral direction), and FIG. 2C shows a distribution of spatial frequency in a Y-axis direction (longitudinal direction). The magnitude of chromatic aberration corresponds to spatial frequency, so that the larger the spatial frequency, the larger the chromatic aberration. Accordingly, the chromatic aberration is largest at an end portion of a hologram. In general, a combiner of a headup display for an automobile has a rectangular shape elongated in the lateral direction as shown in FIG. 1, because a displayed image is longer in the lateral direction and a range of variations in position of driver's eyes is also wider in the lateral direction.

In the case that the combiner has the distributions of spatial frequency as shown in FIGS. 2B and 2C, the spatial frequency at the upper and lower ends of the combiner is smaller than that at the right and left ends of the combiner. Accordingly, even if the spatial frequency at the right and left ends of the combiner is a spatial frequency corresponding to a limit of chromatic aberration, the chromatic aberration at the upper and lower ends of the combiner is enough small. Accordingly, the spatial frequency in the longitudinal direction of the combiner can be increased. The conventional hologram 2 shown in FIG. 2A is produced with a distribution of spatial frequency such that chromatic aberration at the right and left end portions is not so remarkable.

Figure 3A:
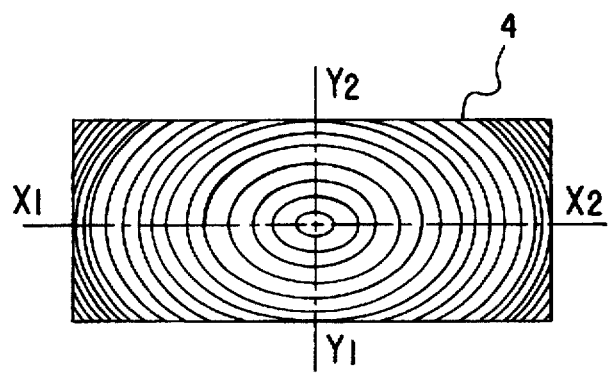
FIG. 3A is a view showing the elliptic interference fringes of a reflection-type hologram according to the present invention.
Figure 3B:
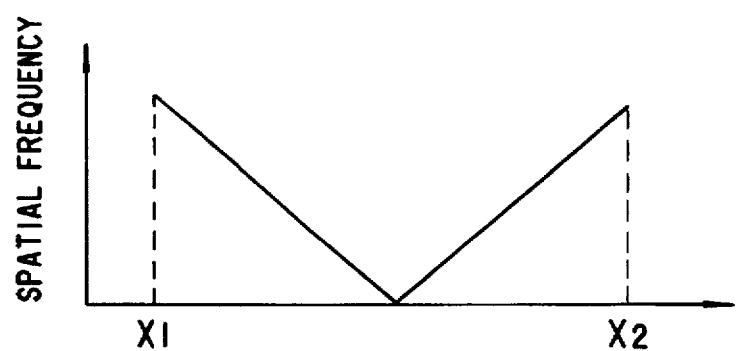
FIG. 3B is a view showing a distribution of spatial frequency in the lateral direction of the hologram shown in FIG. 3A.
Figure 3C:
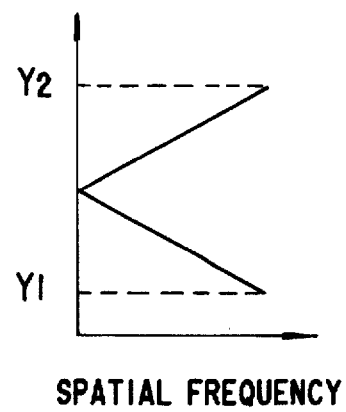
FIG. 3C is a view showing a distribution of spatial frequency in the longitudinal direction of the hologram shown in FIG. 3A.

In a hologram 4 as shown in FIG. 3A, having a distribution of spatial frequency such that the spatial frequency at the right and left ends of the hologram is substantially equal to that at the upper and left ends of the hologram, the focal length Fy in the longitudinal direction is shorter than the focal length Fx in the lateral direction. In respect of the hologram 4 shown in FIG. 3A, FIG. 3B shows a distribution of spatial frequency in an X-axis direction (lateral direction), and FIG. 3B shows a distribution of spatial frequency in a Y-axis direction (longitudinal direction). As apparent from these figures, the spatial frequency at the right and left ends of the hologram 4 is substantially equal to that at the upper and lower ends of the hologram 4.

Figure 4:
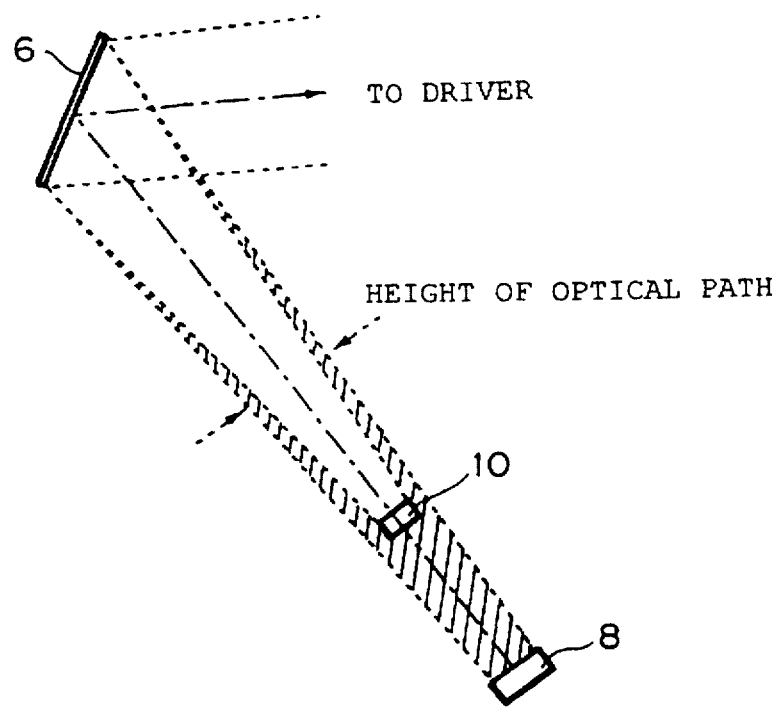
FIG. 4 is a view showing an optical path from a display source to a combiner.

FIG. 4 illustrates an optical path from a display source 8 or 10 to a combiner 6 on the assumption that a mirror or the like usually located therebetween is omitted, so that the optical path shown is straight. As apparent from FIG. 4, the longitudinal size of the display source 10 according to the present invention is made smaller than that of the display source 8 in the conventional hologram by decreasing the focal length in the longitudinal direction of the combiner. Accordingly, the height of the optical path to the combiner 6 is reduced and the length of the optical path is also reduced.

Accordingly, an optical unit of a headup display can be thinned according to the present invention. That is, the optical unit can be reduced by the space shown by a hatched portion in FIG. 4. If only the focal length in the longitudinal direction of the combiner is shortened, there occurs astigmatism to cause distortion of a displayed image. It is therefore necessary to correct the astigmatism by incorporating a concave mirror having a cylindrical reflecting surface into an optical system to compensate for a lack of magnification power in the lateral direction of the combiner. The axis of the cylindrical reflecting surface must be directed in the longitudinal direction.

Figure 5:
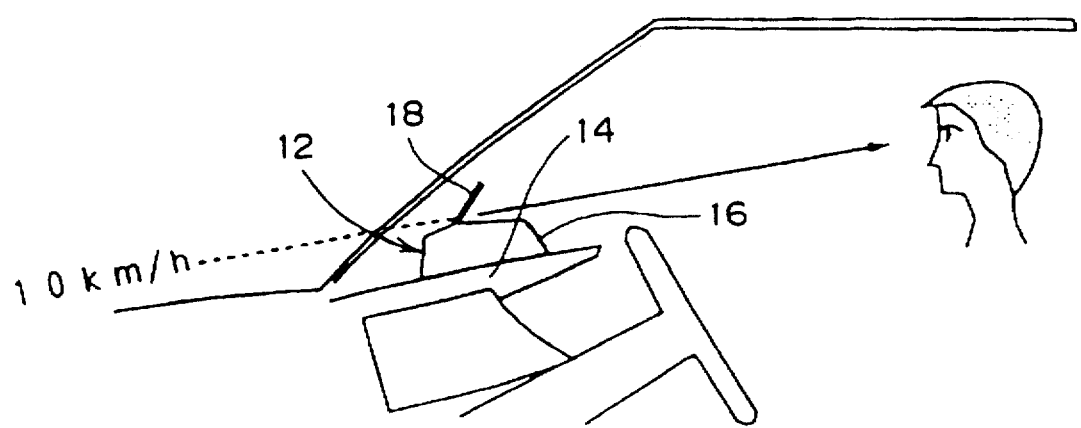
FIG. 5 is a schematic illustration of a headup display mounted in an automobile, according to the present invention.

Referring to FIG. 5, there is shown a schematic view of a headup display 12 mounted in an automobile, according to the present invention. The headup display 12 is mounted on a dashboard 14, for example. The headup display 12 is composed of an optical unit 16 and a combiner 18 formed from a reflection-type hologram.

Figure 6:
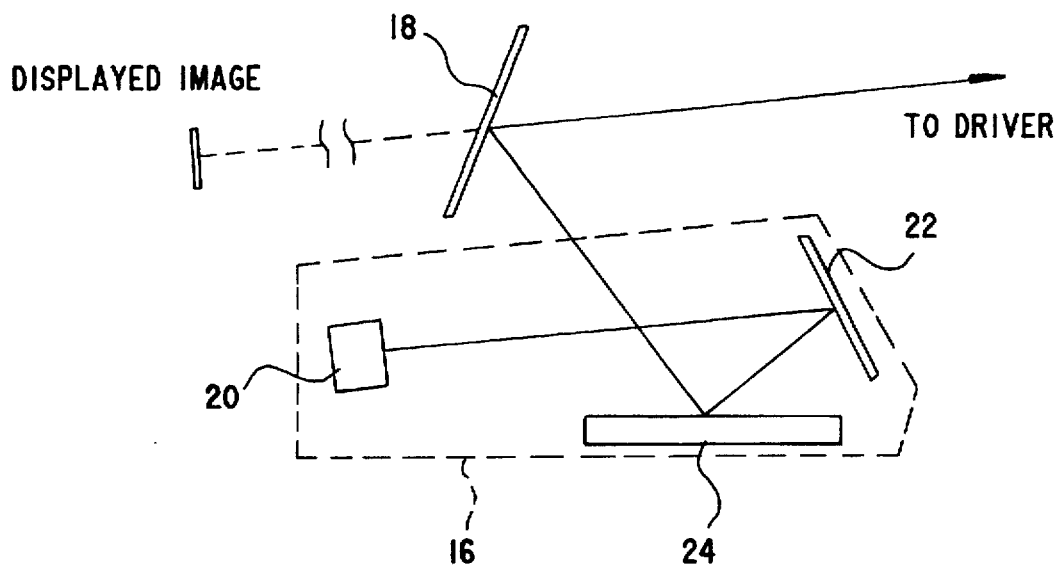
FIG. 6 is a side view of a headup display according to a first preferred embodiment of the present invention.
Figure 7:
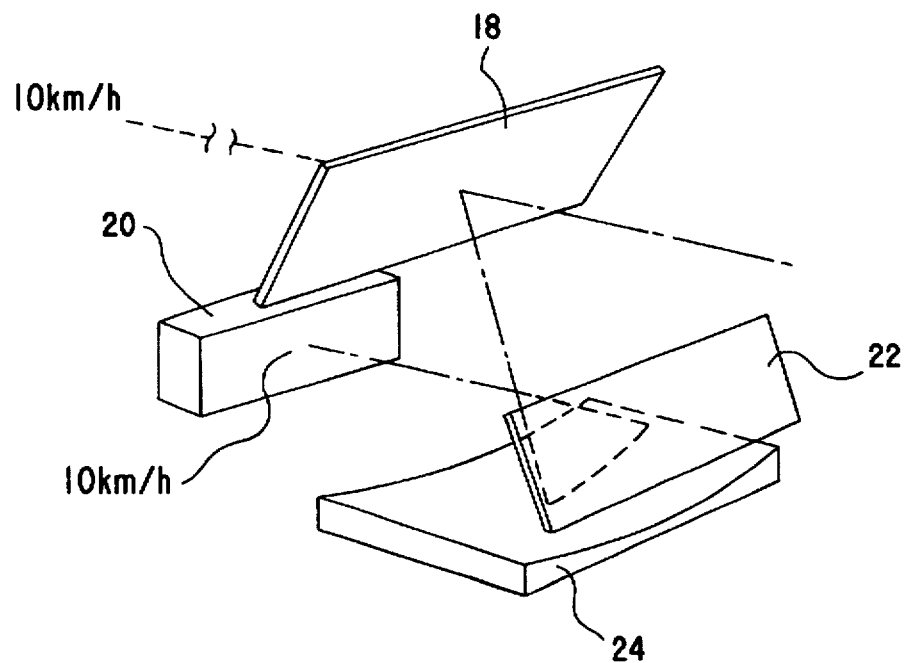
FIG. 7 is a perspective view of the headup display shown in FIG. 6.

Referring to FIGS. 6 and 7, there are shown a side view and a perspective view, respectively, showing a first preferred embodiment of the present invention. The optical unit 16 is composed of a light emission-type display source 20 such as a fluorescent display tube, a plane or flat mirror 22, and a concave mirror 24 having a cylindrical surface. Examples of the display source 20 may also include a liquid crystal display, plasma display, and cathode ray tube. The cylindrical concave mirror 24 is configured so that its lateral focal length contributing to lateral enlargement of a displayed image is shorter than its longitudinal focal length contributing to longitudinal enlargement of the displayed image.

The combiner 18 formed from the reflection-type hologram is configured so that its longitudinal focal length contributing to longitudinal enlargement of the displayed image is shorter than its lateral focal length contributing to lateral enlargement of the displayed image. Display light emitted from the display source 20 is reflected on the plane mirror 22, the cylindrical concave mirror 24, and the combiner 18 in this order to reach driver's eyes. The driver can see a displayed image enlarged by the cylindrical concave mirror 24 and the combiner 18, which displayed image is superimposed on a front view seen by the driver.

The use of the headup display according to this preferred embodiment allows the driver to recognize the information displayed by the display source 20 without almost turning his/her eyes from the front view. Accordingly, the headup display according to this preferred embodiment is especially effective as display means for a navigation system for an automobile.

The chromatic aberration of a displayed image depends on the spatial frequency of a hologram combiner, the distance from the displayed image to the hologram combiner, and the wavelength band of light reflected on the hologram combiner. In the headup display 12 according to this preferred embodiment, the spatial frequency of the hologram combiner 18 at its end portion is 110 lines/mm; the distance from the displayed image to the hologram combiner 18 is 500 mm; and the wavelength band is 520 to 545 nm. In these conditions, the chromatic aberration of the displayed image reflected on the end portion of the hologram combiner 18 is about 4 minutes, which is so small as not to be visibly recognized by human eyes. In the case that the hologram combiner 18 has a lateral length of 120 mm and a longitudinal length of 60 mm, and the spatial frequency at the end portion of the hologram combiner 18 is 110 lines/mm, the lateral focal length Fx and the longitudinal focal length Fy of the hologram combiner 18 become about 1000 mm and about 510 mm, respectively.

The cylindrical concave mirror 24 having a focal length of 310 mm is located in the optical unit 16 so as to reflect light to the hologram combiner 18 as shown in FIGS. 6 and 7, thereby effecting the lateral enlargement of the displayed image. Accordingly, astigmatism can be canceled by the concave mirror 24 and the hologram combiner 18, thereby allowing display of a clear image. Further, the longitudinal focal length of the hologram combiner 18 is set to about half of the lateral focal length. Therefore, as compared with the conventional hologram combiner having an enlargement magnification of about 1.5 times both in the lateral direction and in the longitudinal direction, the magnification power of the hologram combiner 18 according to this preferred embodiment becomes about 2.2 times in the longitudinal direction only.

Accordingly, the size of a display pattern of the display source 20 can be reduced to about 68% of that in the prior art, and the height of an optical path from the display source 20 to the hologram combiner 18 can also be reduced as a whole. As a result, the optical unit 16 can be generally thinned to about 90% of that in the prior art, thereby reducing possible obstruction of the headup display 12 located on the dashboard 14 against the front view.

Figure 8:
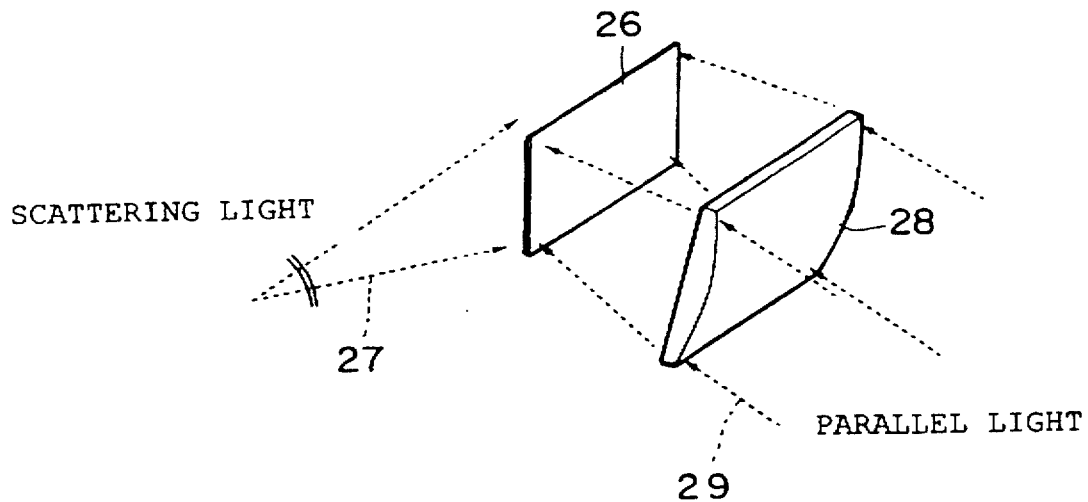
FIG. 8 is a perspective view illustrating a preparing method for a hologram combiner.

FIG. 8 shows an example of a preparing method for the hologram combiner according to this preferred embodiment. A laser beam from a laser (not shown) is split to two laser beams. One of the two laser beams is made incident on a holographic dry plate 26 in the form of spherical waves 27. The other laser beam is collimated to form a collimate beam 29, which is then converged by a cylindrical lens 28 and made incident on the holographic dry plate 26. In this manner, it is possible to prepare a reflection-type hologram whose interference fringes have an elliptic distribution as shown in FIG. 3A.

Figure 9:
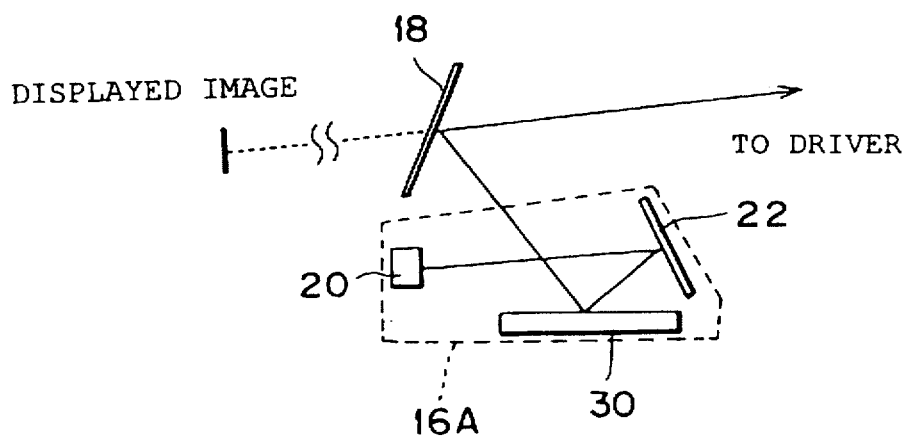
FIG. 9 is a side view of a headup display according to a second preferred embodiment of the present invention.
Figure 10:
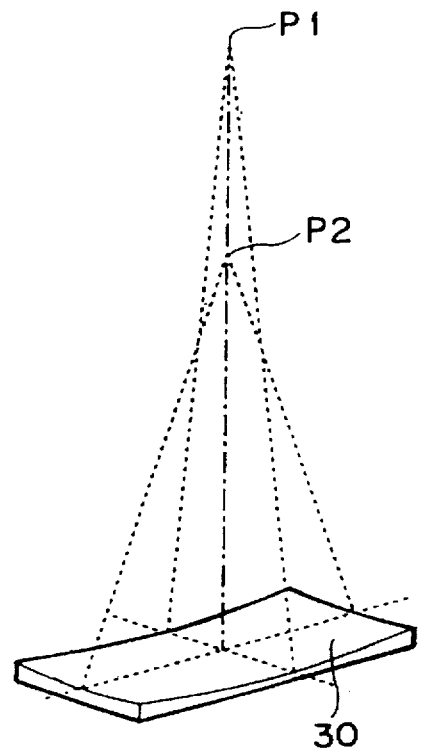
FIG. 10 is a perspective view of a concave mirror having a toroidal surface used in the second preferred embodiment.

FIG. 9 is a side view of a headup display according to a second preferred embodiment of the present invention. In this preferred embodiment, a concave mirror 30 having a toroidal surface is used instead of the cylindrical concave mirror 24 used in the first preferred embodiment. As shown in FIG. 10, the toroidal concave mirror 30 is configured so that its lateral focal length P2 is shorter than its longitudinal focal length P1. By using the toroidal concave mirror 30 having such focal length characteristics, astigmatism occurring in a hologram combiner 18 is canceled.

The toroidal concave mirror 30 has an image enlarging function both in the longitudinal direction and in the lateral direction, so that a display source 20 having a smaller display pattern can be used. Further, the length of an optical path from the display source 20 to the hologram combiner 18 can be shortened by the image enlarging function of the toroidal concave mirror 30, so that an optical unit 16A of the headup display can be reduced in size as a whole.

Figure 11:
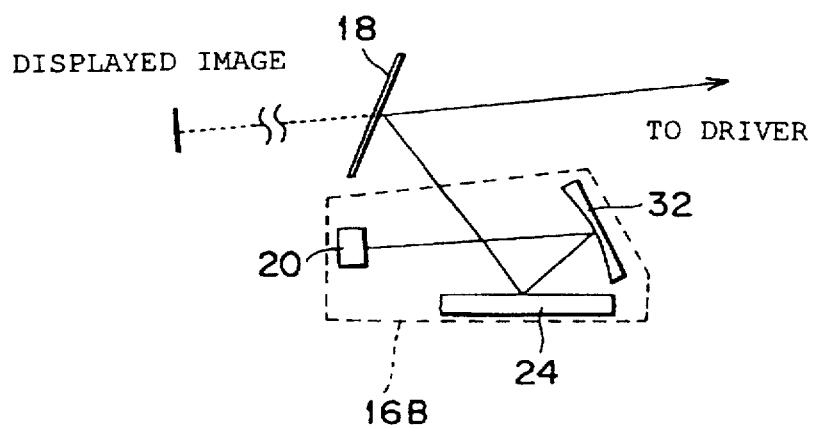
FIG. 11 is a side view of a headup display according to a third preferred embodiment of the present invention.

FIG. 11 is a side view of a headup display according to a third preferred embodiment of the present invention. In this preferred embodiment, a normal concave mirror 32 is used instead of the plane mirror 22 used in the first preferred embodiment, so as to increase the image enlargement magnification in an optical unit 16B. Accordingly, a display source 20 having a smaller display pattern can be used like the second preferred embodiment. Further, the length of an optical path from the display source 20 to a hologram combiner 18 can be shortened to allow a reduction in size of the optical unit 16B as a whole.

Figure 12:
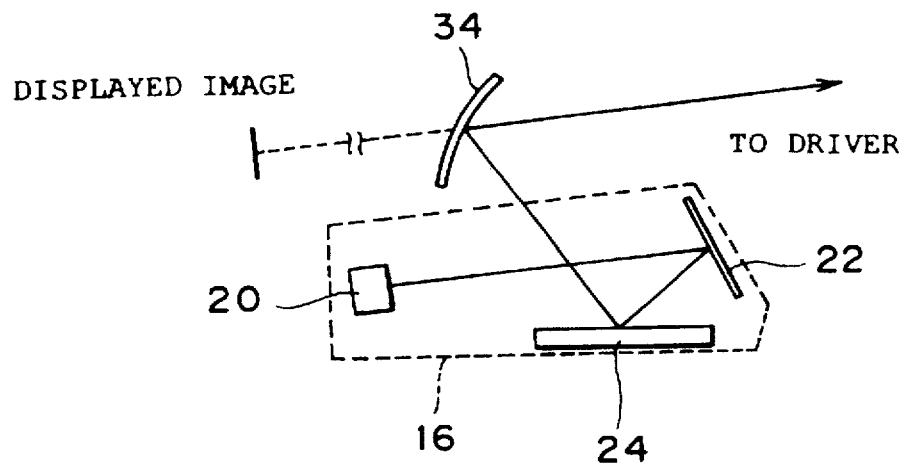
FIG. 12 is a side view of a headup display according to a fourth preferred embodiment of the present invention.
Figure 13:
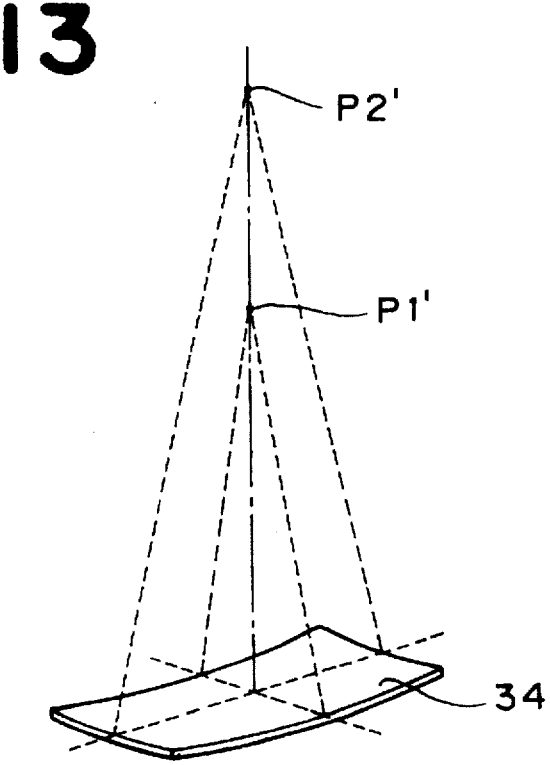
FIG. 13 is a perspective view of a semitransparent concave mirror having a toroidal reflecting surface used in the fourth embodiment.

FIG. 12 is a side view of a headup display according to a fourth preferred embodiment of the present invention. In this embodiment, a semitransparent concave mirror 34 having aspherical reflecting surface is used instead of the reflection-type hologram 18 used in the first to third embodiments. As shown in FIG. 13, the semitransparent concave mirror 34 such as a semitransparent toroidal concave mirror is configured so that its longitudinal focal length P1' is shorter than its lateral focal length P2'.

According to the present invention, the longitudinal focal length of the hologram combiner is shortened to thereby improve a magnification power with the chromatic aberration by the hologram combiner being kept small. Accordingly, the length of optical path from the display source to the combiner can be shortened to allow thinning of the optical unit in the headup display.

The cylindrical concave mirror or the toroidal concave mirror having a shorter radius of curvature in the lateral direction is incorporated in the optical unit of the headup display. Accordingly, astigmatism occurring in the hologram combiner can be corrected to thereby realize a good displayed image with no distortion on the headup display. Further, since the optical unit of the headup display can be thinned, possible obstruction of the optical unit against the front view of the driver can be suppressed even when the headup display is mounted on the dashboard of an automobile.

A method for compensating chromatic aberration by using two concave mirrors is disclosed in Japanese Patent laid-open No. 5-341226, contents of which is incorporated herein by reference. In the present invention, although arrangements of the concave mirrors are different from those of concave mirrors disclosed in the above prior art, the present invention has a similar chromatic aberration compensation effect. Therefore, the optical system of the present invention has a bigger optical power than an optical system having a single concave mirror. Since the optical system having a big optical power can magnify a displayed image with high magnification power, it is possible to reduce the size of the display source as well as to reduce the length of the optical path from the display source to the combiner.

What is claimed is:

1. A headup display comprising:
    a light emission-type display source;
    a first concave mirror located so as to reflect light emitted from said display source, said first concave mirror having an aspherical reflecting surface, said first concave mirror having a lateral focal length contributing to lateral enlargement of a displayed image and a longitudinal focal length contributing to longitudinal enlargement of said displayed image, said lateral focal length being shorter than said longitudinal focal length; and a combiner located so as to reflect the light reflected on said first concave mirror toward an observer in a mobile unit, said combiner having a longitudinal focal length contributing to longitudinal enlargement of said displayed image and a lateral focal length contributing to lateral enlargement of said displayed image, said longitudinal focal length of said combiner being shorter than said lateral focal length of said combiner.

2. A headup display according to claim 1, wherein said combiner comprises a reflection-type hologram.

3. A headup display according to claim 2, wherein said reflection-type hologram has a laterally elongated, rectangular shape, and spatial frequency at laterally opposite ends of said hologram is substantially equal to that at longitudinally opposite ends of said hologram.

4. A headup display according to claim 1, wherein said aspherical reflecting surface of said first concave mirror is a cylindrical surface.

5. A headup display according to claim 1, wherein said aspherical reflecting surface of said first concave mirror is a toroidal surface.

6. A headup display according to claim 1, wherein said combiner comprises a semitransparent concave mirror having an aspherical reflecting surface.

7. A headup display according to claim 1, further comprising a second concave mirror located so as to reflect the light emitted from said display source toward said first concave mirror.

8. A headup display according to claim 1, further comprising a plane mirror located so as to reflect the light emitted from said display source toward said first concave mirror.

9. A headup display according to claim 1, wherein said display source is a monitor screen of a car navigation system.

10. An image projecting device comprising:

a light emission-type display source;.

light condensing means located so as to condense light emitted from said display source, said light condensing means having a lateral focal length contributing to lateral enlargement of a displayed image and a longitudinal focal length contributing to longitudinal enlargement of said displayed image, said lateral focal length being shorter than said longitudinal focal length; and a diffraction means located so as to diffract a light condensed by said light condensing means toward an observer in a mobile unit, said diffraction means having a longitudinal focal length contributing to longitudinal enlargement of said displayed image and a lateral focal length contributing to lateral enlargement of said displayed image, said longitudinal focal length of said diffraction means being shorter than said lateral focal length of said diffraction means.

11. An image projecting device according to claim 10, wherein said diffraction means comprises a hologram.

* * * * *